United States Patent
Lisenker et al.

(10) Patent No.: US 6,464,051 B2
(45) Date of Patent: Oct. 15, 2002

(54) MAGNETORHEOLOGICAL DAMPERS WITH IMPROVED WEAR RESISTANCE

(75) Inventors: Ilya Lisenker, Miamisburg; Patrick Neil Hopkins, West Carrollton; William Charles Kruckemeyer, Beavercreek, all of OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/810,323

(22) Filed: Mar. 16, 2001

(65) Prior Publication Data

US 2002/0130003 A1 Sep. 19, 2002

(51) Int. Cl.$^7$ .................................. F16F 9/53
(52) U.S. Cl. .................... 188/267.2; 188/267
(58) Field of Search ............... 188/267, 267.1, 188/267.2

(56) References Cited

U.S. PATENT DOCUMENTS

| | | | | |
|---|---|---|---|---|
| 4,447,275 A | * | 5/1984 | Hiraoka et al. ............. 148/152 |
| 5,014,829 A | * | 5/1991 | Hare, Sr. .................... 188/267 |
| 5,063,894 A | * | 11/1991 | Mielke et al. ........... 123/193 P |
| 5,076,403 A | * | 12/1991 | Mitsui ......................... 188/267 |
| 5,277,281 A | | 1/1994 | Carlson et al. |
| 5,284,330 A | * | 2/1994 | Carlson et al. ........ 267/140.14 |
| 5,363,821 A | * | 11/1994 | Roa et al. ................. 123/193.2 |
| 5,398,917 A | * | 3/1995 | Carlson et al. ........ 267/140.14 |
| 5,590,745 A | * | 1/1997 | Rensel et al. ............... 188/267 |
| 5,599,474 A | * | 2/1997 | Weiss et al. ............. 252/62.52 |
| 5,878,851 A | * | 3/1999 | Carlson et al. ............. 188/267 |
| 6,155,109 A | * | 12/2000 | Supak ......................... 73/120 |
| 6,202,806 B1 | * | 3/2001 | Sandrin et al. .......... 188/267.1 |
| 6,260,675 B1 | * | 7/2001 | Muhlenkamp ............. 188/267 |
| 6,279,701 B1 | * | 8/2001 | Namuduri et al. ....... 188/267.2 |

OTHER PUBLICATIONS

Ed. J.R. Davis, *Electrodeposition Processes,* Metals Handbook, 2nd Ed., ASM International, pp 1140–1152, 1998.

* cited by examiner

*Primary Examiner*—Jack Lavinder
*Assistant Examiner*—Devon Kramer
(74) *Attorney, Agent, or Firm*—Scott A. McBain

(57) ABSTRACT

A damper body for a magnetorheological (MR) damper and associated methods of forming the damper body. The damper body is formed of a base material, such as a steel, and is coated with an abrasion-resistant layer comprising chromium. The layer of chromium provides a sliding wear surface for sliding contact with a reciprocating piston. To avoid high-stress abrasive wear over the expected service life of the magnetorheological damper, the layer of chromium has a minimum thickness greater than or equal to a minimum thickness of about 8 μm. In other embodiments, before applying the abrasion-resistant layer of chromium, the damper body is coated with a layer of a hard coating material having a hardness greater than the hardness of the base material. The effective hardness of the damper body is a composite of the respective hardnesses of the base material comprising the damper body and the layer of hard coating material. The thickness of abrasion-resistant layer of chromium is chosen in direct relation to the effective hardness.

5 Claims, 3 Drawing Sheets

MAGNETORHEOLOGICAL DAMPERS WITH IMPROVED WEAR RESISTANCE

FIELD OF THE INVENTION

This invention relates to magnetorheological dampers and, in particular, to surface finishes for sliding wear surfaces of the damper body in magnetorheological dampers.

BACKGROUND OF THE INVENTION

Magnetorheological (MR) dampening devices or dampers are used in various automotive applications to dampen and control vibration, such as in suspension systems and engine mounts for vehicles, and in other applications for fluid-assisted actuation, such as flow-control valves, brake assemblies, and clutch assemblies. The MR damper device generally comprises a piston mounted within a damper body and adapted for sliding motion in sliding contact with the interior of the damper body. The damper body is typically formed of a plain carbon steel, which commonly has a hardness less than about 240 Brinell hardness number (BHN), and contains a volume of a magnetorheological (MR) fluid. The operation of the MR damper relies upon the unique properties of MR fluids, which are fluid compositions that undergo a change in apparent viscosity in the presence of a magnetic field.

The MR fluid includes numerous microparticles of a ferromagnetic material suspended in a low-viscosity carrier liquid. The microparticles have a size distribution ranging from about 1 $\mu$m to about 25 $\mu$m and are preferably present in an amount between about 50 wt. % and about 90 wt. % of the total composition of the MR fluid. In the presence of an applied magnetic field, the microparticles become polarized and organize into agglomerations or chains, which increases the apparent viscosity or flow resistance of the fluid. When the applied magnetic field is removed, the microparticles return to an unorganized or random state and the viscosity of the MR fluid is lowered.

Hydraulic cylinders include a tubular body, typically formed of a plain carbon steel, and a piston moving within the interior of the tubular body. The piston usually includes a soft piston band that provides a seal between the piston and the tubular body. The piston band readily incorporates any microparticles that are either intentionally present in the cylinder fluid or present as a contaminant in the hydraulic fluid. The wear resistance of the hydraulic cylinder may be improved by coating the interior of the tubular body with a hard chromium plating having a nominal thickness of about 5 $\mu$m. This hard chromium layer provides a sliding wear surface for the piston band and a sliding wear surface for any other moving component that slidingly contacts the interior of the tubular body.

Plain carbon steel is known to experience "high-stress abrasion" during a stroke of the piston when microparticles penetrate through the sliding wear surface afforded by the hard chromium plating and are forced into the underlying plain carbon steel. High-stress abrasion is characterized by plastic deformation that creates or plows deep scratches in the layer of hard chromium plating and the plain carbon steel. The surface damage associated with high-stress abrasion is more severe and the rate of material removal or wear rate is significantly more rapid than for a competing wear mode known as "low-stress abrasion." In the more desirable low-stress abrasion wear mode, microparticles do not penetrate through the layer of hard chromium plating and, instead, cut shallow furrows that remove the sliding wear surface at a relatively slow rate.

Under conditions of high-stress abrasion, the sliding wear surface of the tubular body can rapidly deteriorate due to the presence of microparticles. Once the sliding wear surface has been penetrated, high stress abrasion works to erode the underlying base material of the tubular body. As the sliding wear surface and base material erodes, the hydraulic cylinder may experience a partial or complete loss of functional capability. For example, the abrasive wear can increase the inner diameter of the tubular body near the portion of the sliding wear surface contacted by the piston. The increased diameter dramatically reduces the available dampening forces. In particular, the greatest loss in dampening force occurs for portions of the sliding wear surface near midstroke of the piston, where the piston has the most frequent residence during movement. Accordingly, thin layers of hard chromium plating in the 5 $\mu$m range do not offer significant resistance to penetration and the wear mode remains predominantly high-stress abrasion.

The MR fluid used in MR dampers provides an ample supply of microparticles that accelerate the wear of the damper body caused by the sliding movement of the piston therein. Microparticles become readily trapped between the piston and the sliding wear surface of the damper body. High-stress abrasive wear rapidly erodes the sliding wear surface of the damper body and, as a result, conventional MR dampers are prone to premature and rapid failure at any of the various portions of the sliding wear surface. Despite considerable efforts, manufacturers of conventional MR dampers have been unable to significantly prolong the service life of the damper body. Although the application of a thin 5 $\mu$m layer of a hard chromium coating would retard the failure rate of damper bodies, such thin layers would not prevent the occurrence of high-stress abrasive wear. Thus, the service life of conventional MR dampers is significantly shortened by the deficient wear resistance of conventional damper bodies.

Thus, there is a need to prevent or retard the damage to the sliding wear surfaces of the damper body of an MR damper arising from high-stress abrasive wear.

SUMMARY OF THE INVENTION

The present invention provides damper bodies for a magnetorheological (MR) damper and methods of improving the wear resistance of a damper body for an MR damper. Specifically, the wear resistance is improved by applying a thickness of hard chromium plating or chromium, greater than or equal to a minimum thickness, to the sliding wear surface of the damper body such that the wear mechanism is predominantly low-stress abrasive wear and the base material of the damper body does not experience significant high-stress abrasive wear over the vast majority of the service life of the magnetorheological damper.

According to an embodiment of the present invention, the magnetorheological damper generally comprises a damper body having a cylindrical inner surface and a piston mounted for sliding movement within the damper body. The damper body is formed of a steel and an abrasion-resistant layer comprising chromium is applied to the cylindrical inner surface. The abrasion-resistant layer provides a sliding wear surface for sliding movement of the piston. To ensure that the low carbon steel forming the damper body does not experience significant high-stress abrasive wear over the vast majority of the service life of the magnetorheological damper, the minimum thickness of the abrasion-resistant layer is greater than or equal to about 8 $\mu$m and depends upon the Brinell hardness of the steel.

In more specific embodiments, the magnetorheological damper further comprises a sealed interior space which is substantially filled with a magnetorheological fluid and divided into two chambers by the piston. The magnetorheological fluid comprises microparticles formed of a material exhibiting magnetorheological activity in the presence of a magnetic field and having a size distribution ranging between about 1 μm and about 25 μm. The piston includes a flow passageway that permits the magnetorheological fluid to flow between the two chambers. An electromagnetic is configured and positioned to selectively apply a magnetic field to the magnetorheological fluid flowing through the flow passageway for increasing the effective viscosity thereof.

According to another embodiment of the present invention, the magnetorheological damper comprises a damper body having a cylindrical inner surface and a piston mounted for sliding movement within the damper body. The damper body is formed of a base material having a first Brinell hardness number of at least about 90 BHN. The cylindrical inner surface is covered by a layer of a hard coating material having a thickness greater than or equal to 25 μm and a second Brinell hardness, which is greater than the first Brinell hardness number of the base material. The effective hardness of the damper body is a composite of the first and second Brinell hardnesses of the base material comprising the damper body and the layer of hard coating material, respectively. An abrasion-resistant layer comprising chromium covers the layer of hard coating material and defines a sliding wear surface for sliding movement of the piston. The abrasion-resistant layer has a sufficient additional thickness greater than or equal to a minimum thickness of about 8 μm such that the base material does not experience significant high-stress abrasive wear over an expected service life of the magnetorheological damper. The minimum thickness of the abrasion-resistant layer of chromium is chosen in direct relation to the effective hardness.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention, wherein like reference numerals refer to like features.

DETAILED DESCRIPTION

The present invention addresses the problem of excessive abrasive wear in magnetorheological (MR) dampers by increasing the durability of the damper body. Specifically, the present invention constrains the wear mode or wear mechanism of a sliding wear surface of the damper body to be low-stress abrasion. The present invention eliminates the occurrence of high-stress abrasion for controlling the wear mode by coating the sliding wear surface with a thickness of a hard chromium plating. The thickness of the layer of hard chromium plating is calculated to substantially prevent the appearance of high-stress abrasive wear over the expected service life of the MR damper. The control of the wear mode is achieved with a minimal impact on the design of the MR damper.

Figure 1:
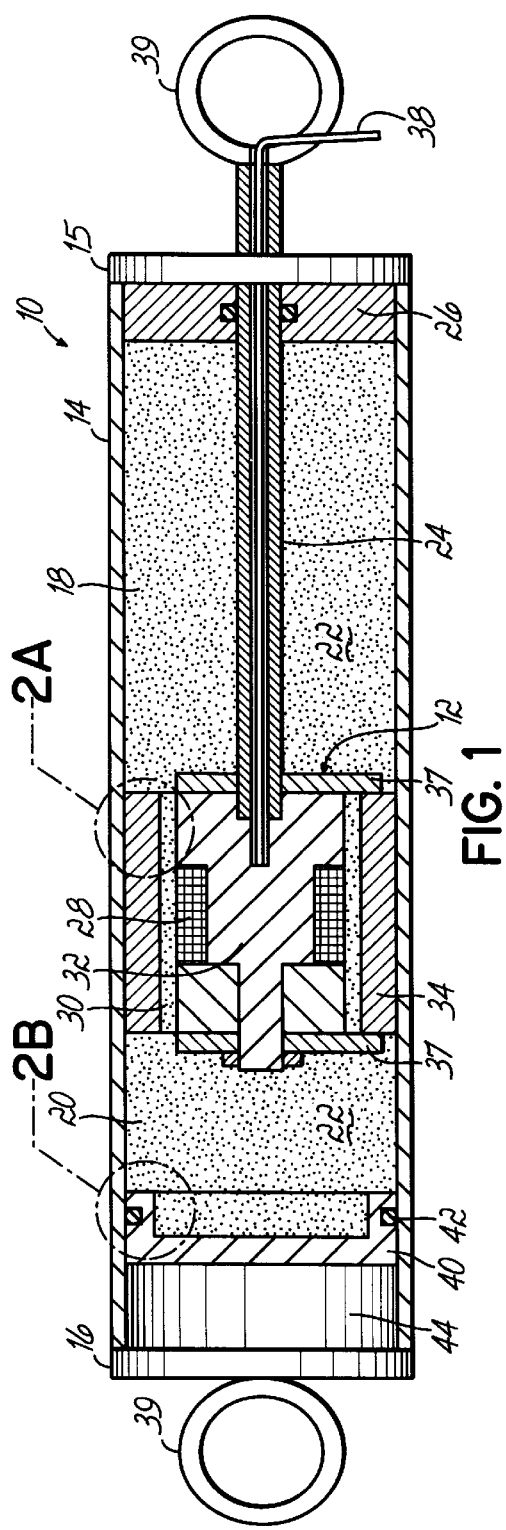
FIG. 1 is a cross-sectional view of a magnetorheological damper having a damper body at least partially covered by a wear-resistant coating according to the present invention.

FIG. 1 shows a conventional MR damper 10 suitable for use in a vibration control application such as the suspension system of a vehicle or a vehicle motor mount. The MR damper 10 includes a piston 12 which, in response to an applied vibrational force, is adapted to slide within a hollow tube or damper body 14. Damper body, 14 is sealed by end caps 15, 16 and has an interior space compartmentalized by the piston 12 into an upper chamber 18 and a lower chamber 20. The interior space includes the volumes of the chambers 18, 20. The upper and lower chambers 18, 20 are filled with an MR fluid 22 having a composition suitable for the particular vibration-control application.

The MR fluid 22 comprises microparticles of a ferromagnetic material known to exhibit MR activity, such as an iron-based powder, suspended in a carrier liquid, such as hydrocarbon, mineral and silicon oils. An MR fluid particularly suitable for use as MR fluid 22 in automotive vibration-control applications comprises a carbonyl iron powder suspended in a synthetic hydrocarbon oil. The microparticles usually have a spherical or near-spherical geometry and a size distribution ranging from about 1 μm to about 25 μm, usually between about 1 μm and about 6 μm.

Piston 12 is attached to a hollow piston rod 24 which is slidingly guided within the inner periphery of an annular sealed bearing 26 provided within the damper body 14. Piston 12 is adapted to slidably move in a reciprocating fashion within damper body 14. The piston 12 comprises an inner core 32, an outer cylindrical flux ring 34, and an electromagnet having the form of a solenoidal coil 28 wound about an exterior portion of the inner core 32. The outer flux ring 34 is typically coated with a hard material such as electroless nickel. The flux ring 34 and the inner core 32 are held in place by end plates 37. Terminals 38 extend through the piston rod 24 to a remote source of electrical power (not shown) for energizing solenoidal coil 28. Attachment eyes 39 are provided on end caps 15, 16 for attaching MR damper 10 to the suspension system of a vehicle (not shown).

The solenoidal coil 28 comprises multiple conductors capable of receiving and circulating an electrical current. By Amperes law, the flow of electrical current in solenoidal coil 28 generates an applied magnetic field directed across an annular low passageway 30 defined between the inner core 32 and the outer cylindrical flux ring 34. The strength of the magnetic field at the position of the annular flow passageway 30 is proportional to the magnitude of the electrical current flowing in solenoidal coil 28.

In response to vibration-induced movement of the piston rod 24, MR fluid 22 flows between chambers 18 and 20 through the annular flow passageway 30. When the solenoidal coil 28 is energized, the effective viscosity of the MR fluid 22 in the annular flow passageway 30 is increased by the interaction of the microparticles with the applied magnetic field. Variations in the electrical current flowing to solenoidal coil 28 can be used to modulate the strength of the applied magnetic field and, thereby, to control the apparent viscosity of the flowing MR fluid 22. The modulation of the apparent viscosity affects the flow rate of the MR fluid 22 through the annular flow passageway 30 to achieve a desired dampening effect.

A floating sealed gas cap 40 separates the MR fluid 22 in chamber 20 from a cavity 44 filled with a pressurized inert gas. The floating gas cap 40 accommodates the displacement of MR fluid 22 due to the varying length of piston rod 24 immersed within the MR fluid 22 of chamber 18 as the piston 12 moves and to accommodate thermal expansion of the MR fluid. The circumference of the gas cap 40 includes an O-ring 42 that provides a fluid-tight sealing engagement with the damper body 14.

Figure 2A:
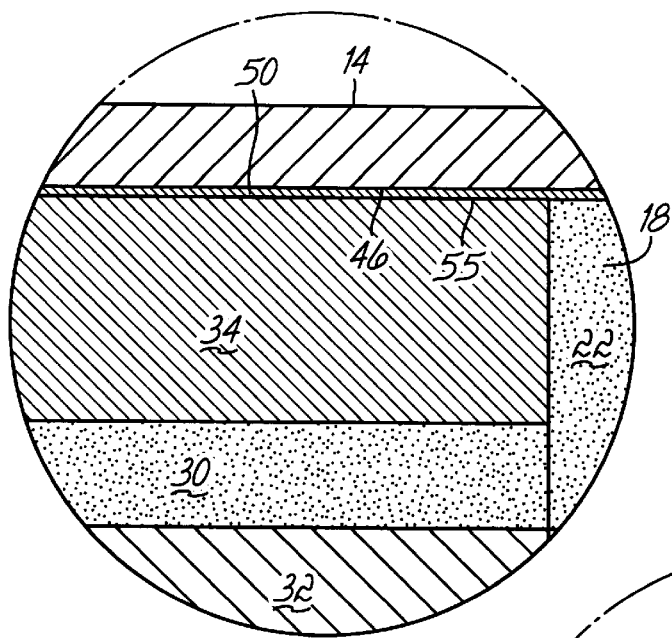
FIG. 2A is an enlarged, cross-sectional view of a first portion of the magnetorheological damper of FIG. 1.
Figure 2B:
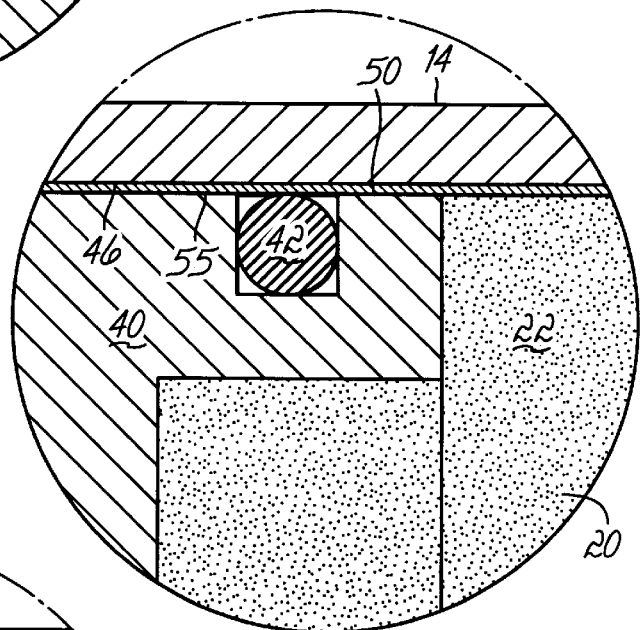
FIG. 2B is an enlarged, cross-sectional view of a second portion of the magnetorheological damper of FIG. 1.

According to one embodiment of the present invention and with reference to FIGS. 1 and 2A–2B, damper body 14 of MR damper 10 is formed of a steel base material, typically a low carbon steel. At least a portion of a cylindrical inner surface 46 of the damper body 14 is coated with a layer of hard chromium plating 50. The layer of hard chromium plating 50 defines and provides a sliding wear surface 55 and, in particular, provides the sliding wear surface 55 for portions of damper body 14 contacted by, and adjacent to, the piston 12 and the gas cap 40. To increase the durability of the layer of hard chromium plating 50 and the base material forming the cylindrical inner surface 46, the minimum thickness of the layer of hard chromium plating 50 is related mathematically to the hardness of the steel forming the damper body 14. As used herein, the minimum thickness represents a threshold thickness for the layer of hard chromium plating 50 below which high-stress abrasive wear appears and the steel of the damper body 14 beneath the cylindrical inner surface 46 begins to suffer significant plastic deformation.

To maximize the service life of the MR damper 10, it is desirable that the layer of hard chromium plating 50 be applied to, or associated with, the cylindrical inner surface 46 with a thickness greater than the minimum thickness. As a result, the wear mode of the sliding wear surface 55 afforded by the layer of hard chromium plating 50 will remain low-stress abrasive wear until enough of the layer 50 is removed by abrasive contact with the piston 12 and the gas cap 40, mediated by the presence of the microparticles in the MR fluid 22, such the thickness of the layer 50 is eroded below the minimum thickness. If the thickness of the layer of hard chromium plating 50 is eroded to a thickness less than the minimum thickness, high-stress abrasive wear begins to appear because the steel forming the damper body 14 is susceptible to significant plastic deformation arising from microparticles trapped between the piston 12 and the sliding wear surface 55 and between the gas cap 40 and the sliding wear surface 55. Accordingly, when the thickness of the hard chromium plating 50 is eroded below the minimum thickness, the wear mode becomes a composite of both low-stress and high-stress abrasive wear. The removal of the layer of hard chromium plating 50 is accelerated by the introduction of a high-stress abrasive wear component to the wear mode. As the layer of hard chromium plating 50 is incrementally worn away by trapped microparticles from the MR fluid 22, the composite wear mode becomes increasingly dominated by high-stress abrasive wear. As the high-stress abrasive wear component increases, the abrasive wear becomes increasingly aggressive and the wear rates of the layer of hard chromium plating 50 and the low carbon steel forming the inner cylindrical surface 46 increase dramatically. Eventually, the wear mode would be entirely high-stress abrasive wear if the MR damper 10 were still functioning at that point in the life cycle.

During a life cycle of a typical MR damper, such as MR damper 10, about 3 $\mu$m of the layer of hard chromium plating 50 is removed from a sliding wear surface, such as sliding wear surface 55, under conditions of pure low-stress abrasive wear. Therefore, to optimize the service life of MR damper 10 by limiting the appearance of high-stress abrasive wear, it is desirable that the as-deposited thickness of the layer of hard chromium plating 50 exceeds the minimum thickness by at least about 3 $\mu$m. The current expected life cycle or service life for automobile MR dampers is 4 million cycles, which roughly corresponds to about 100,000 miles. Parts manufacturers expect the automobile industry to increase the requirement in the future to 6 million cycles, or about 150,000 miles.

Low carbon steels suitable for damper body 14 include, but are not limited to, steels containing less than 0.25 wt. % carbon, such as steels having SAE-AISI designations of 1010, 1015 or 1018, and low-alloy steels containing between about 0.25 wt. % and about 0.7 wt. % of carbon and having alloying elements including chromium, molybdenum, manganese, and silicon. As known by those of ordinary skill in the art, the hardness of low carbon steel generally increases with increasing carbon content. The hardness of the low carbon steel may be increased by conventional metalworking processes, such as cold working. The specific low carbon steel selected for damper body 14 will depend upon the particular vibration dampening and controlling application. Those of ordinary skill in the art of metallurgy will appreciate that damper body 14 may be fabricated from structural materials other than steels, or from steels other than low carbon steel.

Figure 3:
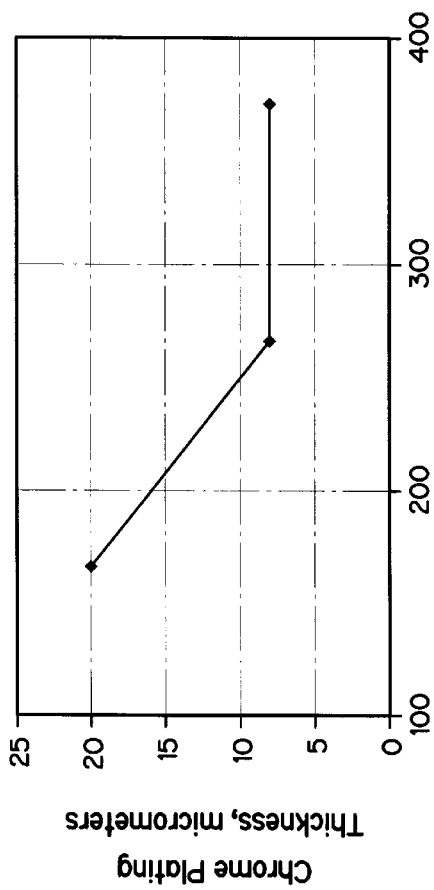
FIG. 3 is a graphical representation of the minimum thickness of a layer of hard chromium plating, needed to create low-stress abrasive wear, as a function of the hardness of the underlying material comprising the damper body of the magnetorheological damper of FIG. 1.

By suitably adjusting the thickness of the layer of hard chromium plating 50 above a threshold minimum thickness, determined as a function of the hardness of the underlying steel of damper body 14, the primary wear mechanism of the layer 50 and the steel forming cylindrical inner surface 46 is engineered to be predominantly low-stress abrasive wear over the expected service life of at least about 4 million cycles of MR damper 10. Referring to the graphical representation of FIG. 3, the minimum thickness of the layer of hard chromium plating 50 needed to provide low-stress abrasive wear is inversely proportional to the hardness of the steel comprising the damper body 10 for "soft" steels, and is constant for harder steels. For steels having a hardness of about 270 Brinell hardness number (BHN) to about 370 BHN, the minimum thickness of the layer of hard chromium plating 50 is equal to about 8 $\mu$m. For steels having a hardness less than about 270 BHN, the minimum thickness of the layer of hard chromium plating 50 needed to assure low-stress abrasion increases by about 1.1 $\mu$m for every 10 BHN drop in hardness. Mathematically, the minimum thickness ($t_m$) for a chrome layer to be applied to a steel of x BHN is as follows:

$$t_m \cong 8\ \mu m,\ \text{where}\ x \geq 270,$$

and $$t_m \cong 8\ \mu m + 0.11(270-x),\ \text{where}\ x < 270$$

For example, the layer of hard chromium plating 50 should be at least 19.55 $\mu$m thick if the low carbon steel forming damper body 14 has a hardness of 165 BHN. The increase in the minimum thickness of the layer of hard chromium plating 50 is generally linear with or inversely proportional to decreasing hardness of the steel below 270 BHN and is given by a line having a slope of about −0.11 μm/BHN and a y-intercept of about 38.86 BHN. Knowing the threshold minimum thickness, it can then be determined what thickness is sufficient above that minimum to keep the damper operating under low-stress abrasive wear conditions for the expected service life. For example, for an expected service life of 4 million cycles, under loads of about 120 Newtons (N) or less, the chrome layer advantageously has a thickness equal to at least the minimum thickness plus about 3 μm.

Referring to FIG. 2A, a portion of the damper body 14 of FIG. 1 near the piston 12 is enlarged to clearly show the layer of hard chromium plating 50 on the cylindrical inner surface 46. Referring to FIG. 2B, a portion of damper body 14 of FIG. 1 near the gas cap 40 is enlarged to clearly show the layer of hard chromium plating 50 on the cylindrical inner surface 46. In accordance with the present invention, the sliding wear surface 55 provided by the layer of hard chromium plating 50 covering cylindrical inner surface 46 is resistant to wear. In particular, the sliding wear surface 55 is resistant to high-stress abrasive wear arising from microparticles from the MR fluid 22 trapped between the piston 12 or the gas cap 40 and the cylindrical inner surface 46. The presence of the hard chromium plating 50 of a minimum thickness according to the present invention produces an initial wear mode that is predominantly low-stress abrasive wear. The presence of the hard chromium plating 50 of a sufficient thickness greater than the minimum thickness according to the present invention produces a wear mode throughout the expected service life of the MR damper that is predominantly low-stress abrasive wear. As a result, the wear rate of damper body 14 is reduced and the service life of MR damper 10 prolonged.

The layer of hard chromium plating 50 of the present invention may be applied to a damper body, such as damper body 14, by various deposition processes familiar to those of ordinary skill in the art. For example, the layer of hard chromium plating 50 may be applied by conventional electrodeposition in a plating tank filled with a solution or acid bath of an appropriate chemistry comprising chromic acid ($CrO_3$) and a catalyst. After immersing the damper body in the solution, a bias potential is applied between the damper body and a second electrode. Chromium ions in the solution are attracted to the negatively-charged damper body, where they chemically bond to the surface thereof. Chromium deposits at a rate that depends upon the geometry of the damper body and the distance from the electrode, among other factors.

Figure 2C:
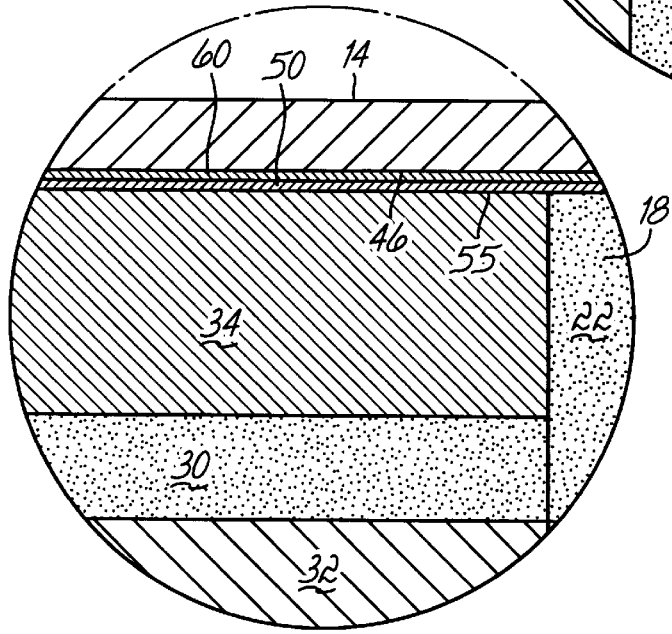
FIG. 2C is an enlarged, cross-sectional view similar to FIG. 2A showing an alternative embodiment of the wear-resistant coating of the present invention.

Referring to FIG. 2C, a portion of a damper body, such as damper body 14 of FIG. 1, near the piston 12 is enlarged to clearly show the layer of hard chromium plating 50 providing the sliding wear surface 55 on the cylindrical inner surface 46. In an alternative embodiment of the present invention as shown in FIG. 2C, a layer of a hard coating material 60, such as electroless nickel, is applied to the cylindrical inner surface 46 of damper body 14 before depositing the layer of hard chromium plating 50. Nickel has a hardness that is generally at the very upper range of the Brinnell scale. Measured on the Vickers hardness scale, hardness values may fall in the range of about 550–700 VHN. If the layer of hard coating material 60 comprises, for example, electroless nickel, a typical thickness ranges between about 25 μm and about 50 μm. For this thickness range of the layer of hard coating material 60, the corresponding minimum thickness of the layer of hard chromium plating 50 ranges between about 8 μm and about 12 μm.

Figure 4:
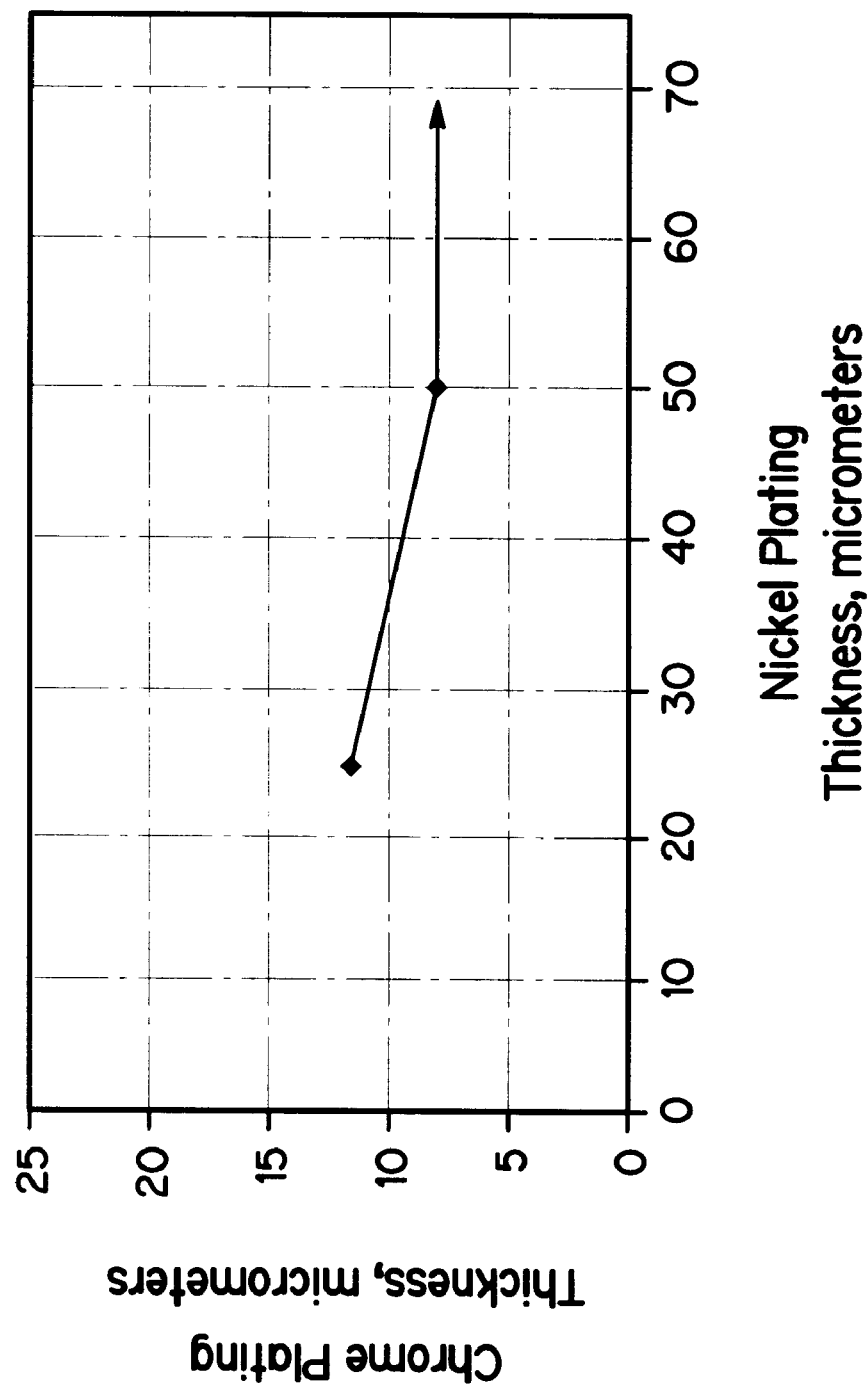
FIG. 4 is a graphical representation of the minimum thickness of a layer of hard chromium plating, needed to create low-stress abrasive wear, as a function of the thickness of an underlying nickel layer on the damper body of the magnetorheological damper of FIG. 1.

Referring to the graphical representation of FIG. 4, the minimum thickness of the layer of hard chromium plating 50 needed to provide low-stress abrasive wear is inversely proportional to the thickness of a nickel coating 60 in the range of 25–50 μm of nickel. At thicknesses less than 25 μm, there is no benefit in abrasion resistance by virtue of the hard coating material 60. At thicknesses greater than 50 μm, no additional abrasion resistance appears to occur beyond that achieved by a 50 μm thick layer. This relationship is believed to hold true for damper bodies comprising a material of at least about 90 BHN. Mathematically, the minimum thickness tm for a chrome layer to be applied to a nickel layer of y thickness on a damper body of at least about 90 BHN is as follows:

$$t_m \cong 8 \ \mu m, \text{ where } y \geq 50 \ \mu m,$$

and $$t_m \cong 8 \ \mu m + 0.16 \ (50-y), \text{ where } 25 \leq y < 50$$

For example, the layer of hard chromium plating 50 should be at least about 9.6 μm thick on a 40 μm thick nickel plating on 6061-T6 aluminum (90 BHN).

The reason for the lower chromium plating thickness is that the minimum thickness of the layer of hard chromium plating 50 required to produce the sliding wear surface 55 for assuring low-stress abrasion may be reduced because the effective hardness of the underlying damper body is increased by application of the layer of hard coating material 60 to the cylindrical inner surface 46 of damper body 14 before depositing the layer of hard chromium plating 50. By reducing the minimum thickness of the layer of hard chromium plating 50, problems such as uneven plating deposition and rough surface finish, common in electrodeposition operations that deposit thick layers of chromium on large areas, are eliminated or reduced. Further, coating processes for applying the layer of hard chromium plating 50, such as electrodeposition, are difficult to control for obtaining a uniform thickness and chromium is more expensive to apply than a hard coating material, such as electroless nickel.

The layer of hard coating material 60 of the present invention may be applied to the cylindrical inner surface 46 by conventional processes familiar to those of ordinary skill in the art. If the layer of hard coating material 60 is selected to be electroless nickel, for example, nickel is applied by a controlled chemical reduction of nickel ions by a reducing agent such as hypophosphite, aminoborane, or borohydride compounds. The damper body is immersed in a bath containing the source of nickel, usually nickel sulfate, and the reducing agent. Nickel spontaneously deposits on the exposed surfaces of the damper body by an autocatalytic reaction. The autocatalytic reaction persists as long as the surface of the damper body remains in contact with the bath. Because the nickel is being deposited electrolessly by a chemical reaction and not electrochemically, the layer of nickel has a substantially uniform thickness over the surface area.

In another embodiment of the present invention, a damper body of an MR damper, such as damper body 14 of the MR damper 10, may be formed of a base material having a relatively low hardness, compared with a steel. Suitable low-hardness materials suitable as base materials for damper body 14 include, but are not limited to, non-ferrous materials, such as aluminum alloys or, more specifically, non-ferrous materials such as 6061 aluminum. The layer of hard coating material 60 is selected to be a substance having a Brinell hardness number greater than a Brinell hardness number of the base material forming the damper body 14. The thickness of the layer of hard coating material 60 is selected to provide a foundation for the hard chromium plating such that the composite hardness of the layer of hard coating material 60 and the base material of damper body 14 is enhanced.

According to the present invention, the layer of hard chromium coating 50 has a minimum thickness chosen commensurate with the enhanced composite hardness of the base material forming the cylindrical inner surface 46 and the layer of hard coating material 60. When covered by the minimum thickness of the layer of hard chromium plating 50, the sliding wear surface 55 experiences low-stress abrasive wear, in at least the as-deposited condition. As a result, the base material, comprising the cylindrical inner surface 46 does not experience plastic deformation characteristic of high-stress abrasive wear and the wear rate is tailored so that the MR damper 10 does not prematurely fail. A typical thickness for the layer of hard coating material 60 ranges between about 25 $\mu$m and about 50 $\mu$m and, corresponding to this range of thicknesses for layer 60, the minimum thickness of the layer of hard chromium plating 50 ranges between about 8 $\mu$m and about 12 $\mu$m. To provide low stress abrasive wear during the expected service life of the damper, the hard chromium plating 50 has a thickness greater than the minimum thickness, for example about 3 $\mu$m greater than the minimum thickness.

Low-hardness base materials may be useful in those vibration control applications that require better cooling or that require a lower weight than afforded by a damper body, such as damper body 14, formed of a low-carbon steel. Certain low-hardness materials, such as aluminum and aluminum alloys, have properties, such as a higher thermal conductivity and a lower density, that meet these requirements. Moreover, chromium strongly adheres to certain hard coating materials, such as electroless nickel. In contrast, the adhesion is generally poor between chromium and many base materials, such as aluminum and aluminum alloys.

EXAMPLE

Testing was performed with a 1$^{13}$/$_{16}$ inch outer diameter, ½ inch long reciprocating piston made from nickel plated steel sliding on a 25 $\mu$m thick chrome layer over 180 BHN steel. In accordance with the present invention, the threshold minimum thickness ($t_m$) of the chrome layer on a 180 BNN steel is 17.9 $\mu$m. Thus, the chrome layer is 7.1 $\mu$m thicker than the minimum thickness required for low stress abrasive wear. Under a load of 120 N, the service life was greater than 6 million cycles with negligible wear of less than 3 $\mu$m. Under a load of 240 N, the service life was greater than 4 million cycles with wear less than 8 $\mu$m.

By comparison, testing was performed using the same reciprocating piston, but sliding on a 12 $\mu$m thick chrome layer over 180 BHN steel. Thus, the chrome layer thickness is less than the determined threshold minimum thickness under a load of 120 N, the service life was less than 1 million cycles with the chrome layer completely removed from the sliding wear surface and the underlying steel heavily gouged.

While the present invention has been illustrated by the description of embodiments thereof, and while those embodiments have been described in considerable detail, they are not intended to restrict or in any way limit the scope of the appended claims to such detail. Additional advantages and modifications will readily appear to those skilled in the art. For example, in its broader aspects, the present invention is not limited for use in MR dampers and may find utility in other automotive applications, such as engine mounts, flow-control valves, brake assemblies, clutch assemblies, and the like. The invention in its broader aspects is therefore not limited to the specific details, representative apparatus, and methods shown and described. Accordingly, departures may be made from such details without departing from the scope or spirit of applicant's general inventive concept.

What is claimed is:

1. A magnetorheological damper comprising: a damper body having a cylindrical inner surface, said damper body formed of a base material of
    a first Brinell hardness number of at least about 90 BHN;
    a piston mounted for sliding movement within said damper body;
    a layer of thickness y≧25 $\mu$m of nickel covering the cylindrical inner surface, said nickel having a second Brinell hardness greater than the first Brinell hardness number of the base material; and
    an abrasion-resistant layer comprising chromium covering the layer of nickel, said abrasion-resistant layer defining a sliding wear surface for sliding movement of said piston and having a sufficient additional thickness greater than a minimum thickness $t_m$ such that the base material does not experience significant high-stress abrasive wear over an expected service life of the magnetorheological damper, wherein $t_m$≅8 $\mu$m for y≧50 $\mu$m and $t_m$≅8 $\mu$m+0.16 (50−y) for 25≦y<50.

2. A method of improving the wear resistance of a damper body for a magnetorheological damper, the damper including a piston adapted to move inside a cylindrical inner surface of the damper body, said method comprising:
    forming the damper body of a steel having a Brinell hardness of x; and
    electrochemically depositing an abrasion-resistant layer comprising chromium applied to the cylindrical inner surface, said abrasion-resistant layer providing a sliding wear surface for sliding movement of the piston and having a sufficient additional thickness greater than a minimum thickness $t_m$ such that the steel does not experience significant high-stress abrasive wear over an expected service life of the magnetorheological damper, wherein $t_m$≅8 $\mu$m for x≧270 and $t_m$≅8 $\mu$m+0.11 (270−x) for x<270.

3. A method of improving the wear resistance of a damper body for a magnetorheological damper, the damper including a piston moving within a cylindrical inner surface of the damper body, said method comprising:
    forming the damper body of a base material having a first Brinell hardness number of at least about 90 BHN; and
    applying a layer of thickness y≧25 $\mu$m comprising nickel to at least a portion of the cylindrical inner surface, wherein the nickel has a second Brinell hardness number greater than the first Brinell hardness number of the base material; and
    applying an abrasion-resistant layer comprising chromium covering the layer of nickel, said abrasion-resistant layer defining a sliding wear surface for sliding movement of said piston and having a sufficient additional thickness greater than a minimum thickness tm such that the base material does not experience significant high-stress abrasive wear over an expected service life of the magnetorheological damper, wherein $t_m$≅8 $\mu$m for y≧50 and $t_m$≅8 $\mu$m+0.16 (50−y) for 25≦y<50.

4. A method of improving the wear resistance of a damper body for a magnetorheological damper, the damper including a piston moving within a cylindrical inner surface of the damper body, said method comprising:

forming the damper body of a base material having a first Brinell hardness number of at least about 90 BHN; and applying a layer of thickness y≧25 μm comprising a hard coating material to at least a portion of the cylindrical inner surface, wherein the hard coating material has a second Brinell hardness number greater than the first Brinell hardness number of the base material; and applying an abrasion-resistant layer comprising chromium covering the layer of hard coating material, said abrasion-resistant layer defining a sliding wear surface for sliding movement of said piston and having a sufficient additional thickness greater than a minimum thickness $t_m$ such that the base material does not experience significant high-stress abrasive wear over an expected service life of the magnetorheological damper, wherein $t_m \cong 8$ μm for y≧50 and $t_m \cong 8$ μm+0.16 (50−y) for 25≦y<50, wherein the applying the layer of hard coating material comprises depositing nickel electrolessly to at least a portion of the sliding wear surface.

5. A method of improving the wear resistance of a damper body for a magnetorheological damper, the damper including a piston moving within a cylindrical inner surface of the damper body, said method comprising:

forming the damper body of a base material having a first Brinell hardness number of at least about 90 BHN; and applying a layer of thickness y≧25 μm comprising a hard coating material to at least a portion of the cylindrical inner surface, wherein the hard coating material has a second Brinell hardness number greater than the first Brinell hardness number of the base material; and applying an abrasion-resistant layer comprising chromium covering the layer of hard coating material, said abrasion-resistant layer defining a sliding wear surface for sliding movement of said piston and having a sufficient additional thickness greater than a minimum thickness $t_m$ such that the base material does not experience significant high-stress abrasive wear over an expected service life of the magnetorheological damper, wherein $t_m \cong 8$ μm for y≧50 and $t_m \cong 8$ μm+0.16 (50−y) for 25≦y<50, wherein the applying of the abrasion-resistant layer comprises depositing chromium electrochemically over the layer of hard coating material.

* * * * *